United States Patent
Klompenhouwer et al.

(10) Patent No.: US 8,325,198 B2
(45) Date of Patent: Dec. 4, 2012

(54) COLOR GAMUT MAPPING AND BRIGHTNESS ENHANCEMENT FOR MOBILE DISPLAYS

(75) Inventors: Michiel Adriaanszoon Klompenhouwer, Breda (NL); Emo Hermanus Antonius Langendijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1002 days.

(21) Appl. No.: 10/575,578

(22) PCT Filed: Oct. 27, 2004

(86) PCT No.: PCT/IB2004/052222
§ 371 (c)(1), (2), (4) Date: Apr. 11, 2006

(87) PCT Pub. No.: WO2005/043887
PCT Pub. Date: May 12, 2005

(65) Prior Publication Data
US 2007/0076226 A1    Apr. 5, 2007

Related U.S. Application Data

(60) Provisional application No. 60/517,059, filed on Nov. 4, 2003.

(51) Int. Cl.
*G09G 5/02* (2006.01)
(52) U.S. Cl. ........................................ 345/590
(58) Field of Classification Search .................... 345/590
See application file for complete search history.

(56) References Cited

U.S. PATENT DOCUMENTS

| | | | | |
|---|---|---|---|---|
| 5,355,225 A * | 10/1994 | Bachmann et al. | ........... | 348/645 |
| 5,619,280 A * | 4/1997 | Yamashita et al. | ............ | 348/645 |
| 5,774,112 A * | 6/1998 | Kasson | ......................... | 345/601 |
| 5,929,843 A * | 7/1999 | Tanioka | ........................ | 345/600 |
| 6,018,588 A * | 1/2000 | Kim | ............................... | 382/167 |
| 6,078,686 A * | 6/2000 | Kim | ............................... | 382/167 |
| 6,275,606 B1 | 8/2001 | Myers | | |
| 6,384,836 B1 * | 5/2002 | Naylor et al. | ................. | 345/589 |
| 6,411,304 B1 * | 6/2002 | Semba et al. | ................. | 345/590 |
| 6,453,067 B1 * | 9/2002 | Morgan et al. | ............... | 382/162 |
| 6,594,387 B1 * | 7/2003 | Pettitt et al. | .................... | 382/167 |
| 2001/0003456 A1 * | 6/2001 | Kagawa et al. | ............... | 345/418 |
| 2002/0041288 A1 * | 4/2002 | Myers | ......................... | 345/602 |
| 2003/0043165 A1 * | 3/2003 | Miyachi et al. | ............... | 345/589 |
| 2003/0128872 A1 * | 7/2003 | Lee et al. | ....................... | 382/162 |
| 2004/0156544 A1 * | 8/2004 | Kajihara | ........................ | 382/167 |
| 2004/0263456 A1 * | 12/2004 | Miyachi et al. | .................. | 345/88 |
| 2005/0213125 A1 * | 9/2005 | Smith et al. | ..................... | 358/1.9 |
| 2005/0248551 A1 * | 11/2005 | Pasqualini et al. | ............ | 345/204 |

FOREIGN PATENT DOCUMENTS
EP    0961488    12/1999

* cited by examiner

*Primary Examiner* — Edward Martello

(57) ABSTRACT

An apparatus and method for primary color correction and clipping is provided that is particularly suited for application in mobile displays. It is a combination of a brightness reduction, and a 'smart' clipping algorithm and is based on the perceptual attribute "colorfulness", in which images that are brighter seem to posses more color. In the smart clipping algorithm, a brightness reduction is followed by a gamut (primary) correction and then a smart clip is performed by "adding white" to the out-of-gamut pixels only. This reduces the saturation while it increases the brightness. That is, the saturation is decreased in favor of increased brightness, which gives similar colorfulness on a mobile display as on an EBU display. This smart clipping affects those colors that cannot be represented on the display.

22 Claims, 13 Drawing Sheets

```
% Assume input image is 0<(R,G,B)<1

% Constants
MIN = 0                    (typically 0 or 16/255)
MAX = 1                    (typically 1 or 235/255)

IMAXFAC = g(A1,A2)         (reduce overall brightness, depends on input gamut and display gamut, e.g. 0.85)

% Effect size (larger with larger values of R,G,B)
ALPHA = f(R,G,B)   (e.g. max(R,G,B) or √(R^2+G^2+B^2), or c_1R+c_2G+c_3B)

% Reduce overall brightness
(R,G,B) = (R,G,B)*IMAXFAC

% Gamma correction (go to linear color domain, this
% can be omitted for simplification, to reduce the
% number of operations, but the color transformations
% are no longer very accurate)
(R,G,B) = (R,G,B)^GAMMA % Gamut correction (expansion)
(R,G,B) = inv(A2) * A1 * (R,G,B)

% Clipping values < MIN if any((R,G,B)<MIN), Subtract
% minimum multiplied with certain factor depending on
% intensity
(R,G,B) = (R,G,B) + ALPHA*(MIN – min(R,G,B,MIN))
end % Clipping values > MAX if any((R,G,B)>MAX),
% Scale RGB vector within maximum
(R,G,B) = (R,G,B) * (MAX/max(R,G,B,MAX))
end % Inverse gamma correction, if needed
(R,G,B) = (R,G,B)^(1/GAMMA)
```

FIG. 14

```
% Assume input image is 0<(R,G,B)<1

% Constants
MIN = 0         (typically 0 or 16/255)
MAX = 1         (typically 1 or 235/255)
IMAXFAC = g(A1,A2)    (reduce overall brightness, depends on input gamut and display gamut, e.g. 0.85)

% Effect size (larger with larger values of R,G,B)
ALPHA = f(R,G,B)    (e.g. max(R,G,B) or √(R^2+G^2+B^2), or c1R+c2G+c3B)

% Reduce overall brightness
---(R,G,B) = (R,G,B)*IMAXFAC---
(R,G,B) = (R,G,B)*F(S);
% Where S is the saturation, that can be calculated from R,G,B
% and F(S) is a function of S that is equal to MAX for S=0 and
% equal to IMAXFAC for S = some (constant) value between 0 and
% the maximum saturation of the primary colors. The function F
% can be any continuously decreasing function, e.g. linear or
% cos^2. For the example below S=0.75 is the cut-off
% saturation for which F(S) is IMAXFAC.

% Gamma correction (go to linear color domain, this can be
% omitted for simplification, to reduce the number of
% operations, but the color transformations are no longer very
% accurate)
(R,G,B) = (R,G,B)^GAMMA % Gamut correction (expansion)
(R,G,B) = inv(A2) * A1 * (R,G,B)

% Clipping values < MIN if any((R,G,B)<MIN),
% Subtract minimum multiplied with certain factor depending on
% intensity
(R,G,B) = 13R,G,B) +  ALPHA*(MIN – min(R,G,B,MIN))
end % Clipping values > MAX if any((R,G,B)>MAX),
% Scale RGB vector within maximum
(R,G,B) = (R,G,B) * (MAX/max(R,G,B,MAX))
end % Inverse gamma correction if needed
(R,G,B) = (R,G,B)^(1/GAMMA)

% Output image is between: MIN<(R,G,B)<MAX
```

FIG. 15

```
% Assume input image is 0<(R,G,B)<1
% Constants
MIN = 0         (typically 0 or 16/255)
MAX = 1         (typically 1 or 235/255)
IMAXFAC = g(A1,A2)    (reduce overall brightness, depends on input gamut and display gamut, e.g. 0.85)

% Effect size (larger with larger values of R,G,B)
ALPHA = f(R,G,B)    (e.g. max(R,G,B) or √(R^2+G^2+B^2), or c1R+c2G+c3B)

% Reduce overall brightness
(X)   [0.4306  0.3415  0.1784]   (R)
(Y) = [0.2220  0.7067  0.0713] * (G)
(Z)   [0.0202  0.1296  0.9393]   (B)

u' = 4*X/(X + 15*Y + 3*Z)
v' = 9*Y/(X + 15*Y + 3*Z)

S = 13*sqrt((u'-0.1978).^2+(v'-0.4683).^2);
SCUT = 0.75;
if S>SCUT,
  F = IMAXFAC;
else
  F = (((1+cos(S/SCUT*pi))/2).^2) *(1-IMAXFAC) + IMAXFAC;
end
(R,G,B) = (R,G,B)*F;
% Where S is the saturation, that can be calculated from R,G,B
% and F(S) is a function of S that is equal to MAX for S=0 and
% equal to IMAXFAC for S = some (constant) value between 0 and
% the maximum saturation of the primary colors. The function F
% can be any continuously decreasing function, e.g. linear or
% cos^2. For the example below S=0.75 is the cut-off
% saturation for which F(S) is IMAXFAC.

% Gamma correction (go to linear color domain, this can be
% omitted for simplification, to reduce the number of
% operations, but the color transformations are no longer very
% accurate)
(R,G,B) = (R,G,B)^GAMMA
% Gamut correction (expansion)
(R,G,B) = inv(A2) * A1 * (R,G,B)
% Clipping values < MIN if any((R,G,B)<MIN),
% Subtract minimum multiplied with certain factor depending on
% intensity
(R,G,B) = (R,G,B) + ALPHA*(MIN - min(R,G,B,MIN))
end
% Clipping values > MAX if any((R,G,B)>MAX),
% Scale RGB vector within maximum
(R,G,B) = (R,G,B) * (MAX/max(R,G,B,MAX))
end
% Inverse gamma correction if needed
(R,G,B) = (R,G,B)^(1/GAMMA)
% Output image is between: MIN<(R,G,B)<MAX
```

FIG. 17

COLOR GAMUT MAPPING AND BRIGHTNESS ENHANCEMENT FOR MOBILE DISPLAYS

CROSS REFERENCE TO RELATED APPLICATION

This application claims the benefit of U.S. provisional application Ser. No. 60/517,059 filed Nov. 4, 2003 which is incorporated herein in whole by reference.

The present invention relates to color displays in mobile devices. In particular, the present invention relates to color rendering in mobile displays with limited color gamut. Most particularly, the present invention relates to an apparatus and method for primary color correction and clipping that is especially directed to displays with limited color gamut.

In regular displays the color gamut is smaller than the gamut of the human visual system. This means that some colors that we can see cannot be shown on such a display. Especially in mobile (reflective) displays the gamut is small in order to get as much brightness as possible out of the display. Typically the displays cover less than 36% of the gamut set by the European Broadcast Union (EBU).

FIG. 2 is an example of an EBU display and FIG. 3 is an example of a mobile display having primaries with a saturation of 60% of the saturation of EBU primaries (which is 36% EBU gamut), both with the same brightness. The problem is obvious, the mobile display has poor color rendering in this example.

There are a number of possible solutions: other color filters and gamut mapping, which can be divided into gamut correction and clipping.

One solution to the gamut problem could be to increase the gamut of the display by making the color filters thicker, i.e. make them more saturated by blocking more wavelengths. Of course in an LCD display this will reduce the brightness. In the case of a display with ideal color filters the brightness drops by 30%, but in the case of a typical mobile display the brightness drop is more than 50%, as illustrated in FIG. 4 v. FIG. 5.

On a desktop monitor the display with the large color gamut, FIG. 3, might still be preferred, but if the brightness of the desktop monitor is reduced to 5-10% of the ambient illumination, which approximates a mobile display in a light environment, preference shifts to the brighter display illustrated in FIG. 4 because a lot of detail is missed on the less bright panel illustrated in FIG. 5.

The present invention provides an algorithm to perform Gamut mapping (primary color correction and clipping), particularly for displays with a smaller color gamut than the incoming video signal, such as mobile displays, by trading-off between color gamut and brightness. The essence of the present invention is to use a high brightness small color gamut mobile display and perform a gamut correction on the incoming RGB signal before sending it to the display drivers. This means that, instead of accepting less saturated primaries for the red (R), green (G) and blue (B) signals and thus de-saturating all colors, the RGB signal is corrected for the new primaries. Now, the colors of the input signal that can be represented on the display are not affected, but as a result of this correction, colors that cannot be represented have to be mapped to a color inside the gamut.

Thus, the present invention comprises:
1. a primary color conversion; and
2. a gamut mapping for colors outside the display gamut.

The foregoing and other features and advantages of the invention will be apparent from the following, more detailed description of preferred embodiments as illustrated in the accompanying drawings.

FIG. 14 illustrates a matlab script implementing gamut mapping with 'smart' clipping, according to a preferred embodiment of the present invention;

FIG. 15 illustrates a modification to the matlab script of FIG. 14 that implements peaking according to an alternative preferred embodiment of the present invention;

FIGS. 16 A-D compare an original EBU display A with a conventional 85% EBU display B with the smart clipping of the present invention applied to the conventional EBU display C and with both smart clipping and peaking of the present invention applied to the conventional EBU display D; and FIG. 17 illustrates the matlab script of gamut mapping, 'smart clipping' and smart brightness reduction of FIG. 15 further modified for saturation calculation.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

Figure 1A:
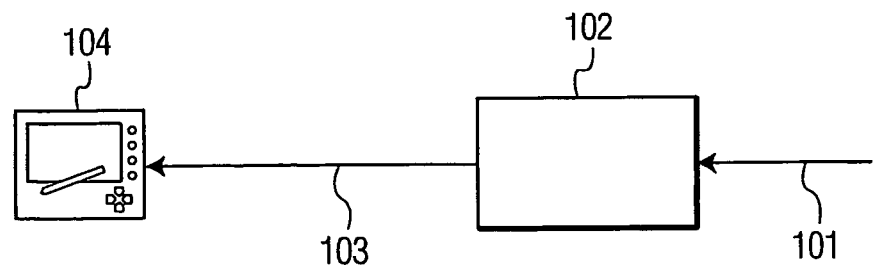
FIG. 1 illustrates a simplified block diagram of a mobile device having a graphics module including the gamut mapping with smart clipping according to the present invention.
Figure 1B:
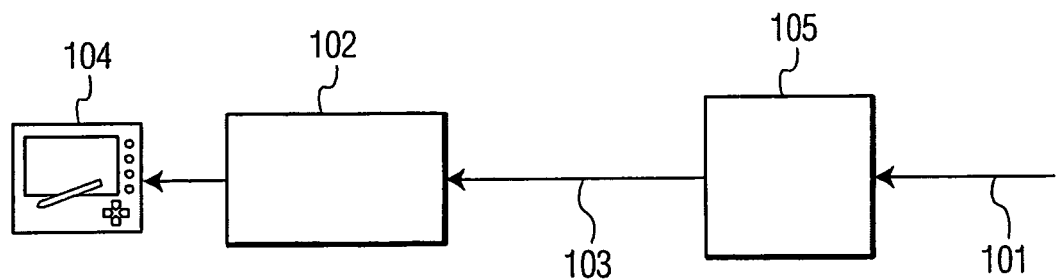

Referring to FIG. 1A, the graphics processor 101 of a mobile display 104 may be modified to perform gamut mapping with smart clipping of an input RGB signal 101 according to a preferred embodiment of the present invention. The resultant RGB signal with "smart" clipping 103 is displayed on the mobile display 104. In this preferred embodiment, the functionality of the gamut mapping with "smart" clipping can be implemented in software or hardware within the graphics processor 101. In an alternative preferred embodiment, illustrated in FIG. 1B, the gamut mapping with "smart" clipping is applied by a dedicated chip 105 to the output signal of a graphics processor 102 and both the graphics processor 102 and dedicated chip 105 are on-board a mobile device with a display 104. Although the description may refer to terms commonly used in describing particular mobile display devices, the description and concepts equally apply to other processing systems, including systems having architectures dissimilar to that shown in FIGS. 1A and 1B.

Figure 1C:
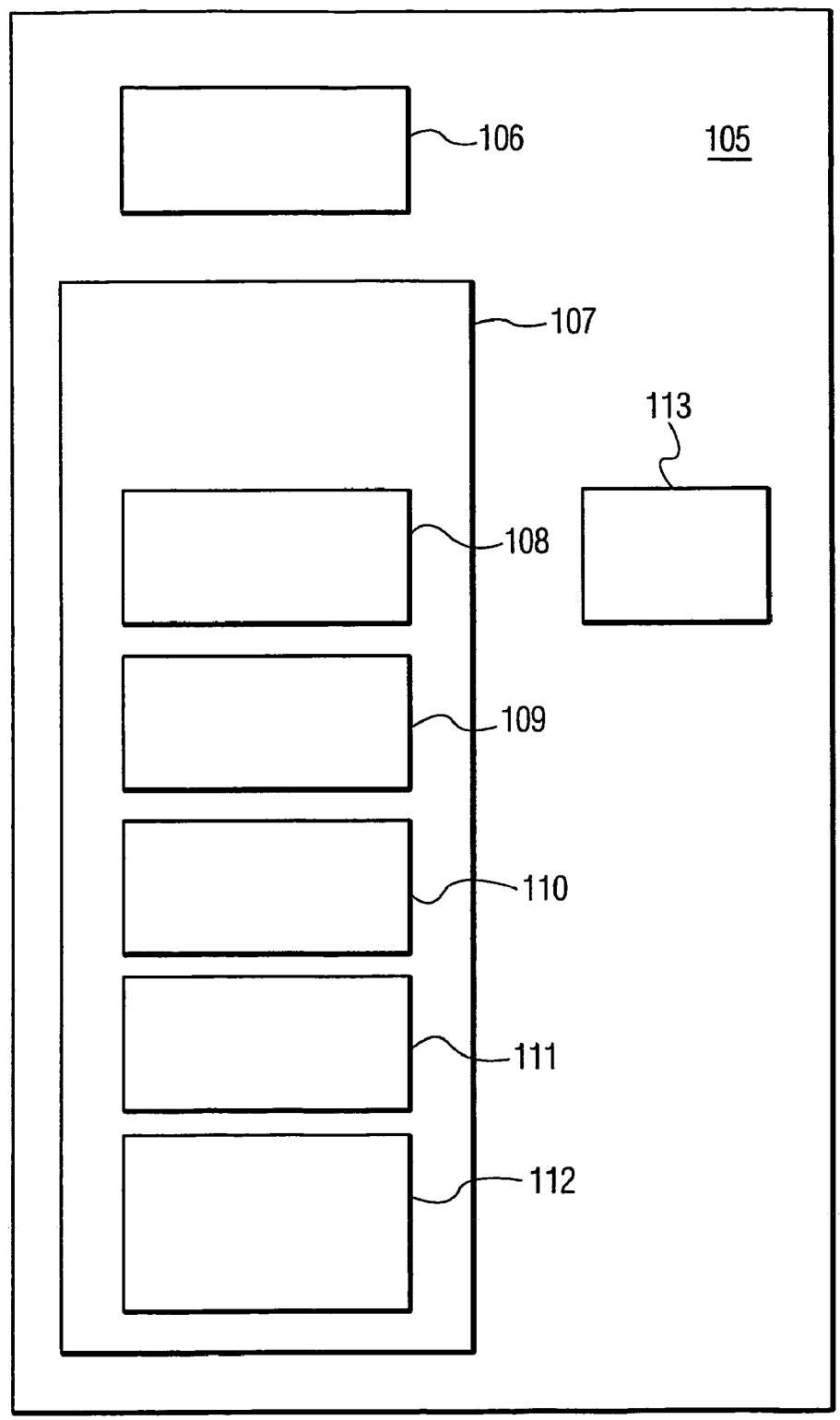
Figure 2:
FIG. 2 illustrates an EBU standard display.
Figure 3:
FIG. 3 illustrates a typical prior art mobile display, which is optimized for brightness at the expense of color gamut by using broad-band color filters.
Figure 4:
FIG. 4 illustrates a mobile display optimized for brightness at the expense of color gamut by using broad-band color filters.
Figure 5:
FIG. 5 illustrates a mobile display optimized for color gamut at the expense of brightness by using narrow-band color filters.

FIG. 1C illustrates 'smart' clipper either on-board the graphics processor 102 of a mobile device or as a standalone chip 105 therein. The 'smart' clipper includes a controller/processor unit 106 that processes instructions, performs calculations and manages the flow of information and images from and to the network interface 113 and from and to the mobile device display 104. Additionally, the controller/processor 106 is communicatively coupled with a program memory 107. Included within the program memory 107 are a multi-step 'smart' clipper module 108 that controls the selection and execution of algorithms: gamma correction algorithms 109, gamut mapping algorithms 110, smart clipping algorithms 111, and peaking algorithms 112. The controller/processor 106 may also manage the network interface 113 for acquiring the digital image data and directing its processing by the multi-step 'smart' clipper module 108 and display on the mobile display 104. Additionally, the controller/processor 106 may store the original and processed digital image data in a data memory (not shown) to allow local editing, redisplay and retransmission over the network of these images. Notably, the network can be a wireless network or wired network.

How to transform a signal that is represented by one set of primary color points, to another set of primaries, is well known in the art. Consider an incoming video signal $RGB_1$ (column with Red, Green, and Blue). Let $A_1$ be a 3×3 matrix, having in each column the tri-stimulus values (X,Y,Z) of the R(ed), G(reen), and B(lue) primaries of an EBU calibrated display. Let $A_2$ be a similar matrix for a mobile display with limited gamut. Then, the matrix multiplication:

$$RGB_2 = (A_2)^{-1} * A_1 * RGB_1 \quad \text{(Eq.1)}$$

converts the signal from the EBU primaries to the display primaries. For a low-saturation mobile display having primaries with incorrect hue this is equivalent to a saturation increase (expansion) and a hue correction of the input signal such that it shows the same colors on the mobile display as the EBU display for colors that are within its gamut. The colors outside its gamut cannot be represented, and have to be mapped to a value inside the gamut. In this mapping process, there are a lot of possibilities.

The simplest form of this mapping, 'clipping', where it is assumed that the display signals range from 0 to 1, is as follows:

for each pixel (R,G,B) perform the following mapping $$R(\text{if } R<0)=0, G(\text{if } G<0)=0, B(\text{if } B<0)=0 \quad \text{(Eq. 2)}$$

$$R(\text{if } R>1)=1, G(\text{if } G>1)=1, B(\text{if } B>1)=1 \quad \text{(Eq. 3)}$$

However, clipping can lead to visible artifacts, (color shifts) and the following algorithm performs better:

$$R(R<0)=0, G(G<0)=0, B(B<0)=0 \quad \text{(Eq. 2')}$$

$$R(R>1)=R(R>1)/\max(R,G,B),$$

$$G(G>1)=G(G>1)/\max(R,G,B), \text{ and}$$

$$B(B>1)=B(B>1)/\max(R,G,B) \quad \text{(Eq. 3')}$$

reducing the saturation by setting negative values to zero and reducing the brightness by scaling with the maximum (R,G,B). This effectively clips the color along a line to the black-point ('clip to black'). The hue will not change.

Figure 6:
FIG. 6 illustrates a mobile display of a Portrait image optimized for brightness at the expense of color gamut by using broad-band color filters.
Figure 7:
FIG. 7 illustrates the effect of using gamut correction of the incoming signal for the images illustrated in FIGS. 3 and 6.
Figure 8:
FIG. 8 illustrates a mobile display of a Parrots image optimized for brightness.
Figure 9:
FIG. 9 illustrates the image of FIG. 7 with a gamut correction of the incoming signal; (note the clipping artifacts on the red head and the yellow breast).

In comparing images illustrated in FIG. 6 v. FIG. 7 the improvement is quite striking, yet, in other images such as the 'Parrots' illustrated FIG. 8 v. FIG. 9, the gamut correction and subsequent mapping result in very annoying clipping artifacts. The difference between the Portrait images of FIGS. 6 and 7 and the Parrot images of FIGS. 8 and 9 is that the Portrait mapping has most colors within the gamut of the mobile display, whereas the Parrot mapping has many colors outside of the color gamut of the mobile display. One can see that the out-of-gamut pixels in the head of the red parrot clip to almost the same red color, and similarly for the yellow, which leads to a loss of texture in these areas.

In order to prevent the clipping artifacts of the gamut correction, one can combine it with a brightness reduction. In this way brightness is exchanged back for color again, but now "digitally" instead of "physically". This prevents a (possibly large) number of pixels with different colors being mapped to the same color, but as a consequence, colors inside the gamut are affected too. This is generally referred to as 'soft-clipping', and the amount of 'soft-clipping' can always be combined with (the remaining amount of) 'hard-clipping' to find a good tradeoff between clipping artifacts and brightness reduction. Brightness reduction only prevents clipping for colors that contain an RGB value that exceeds the maximum, but since these are (by definition) bright pixels, the effect of reducing the clipping artifacts here, can be large.

Figure 10:
FIG. 10 illustrates a mobile display optimized for brightness.
Figure 11:
FIG. 11 illustrates the display of FIG. 8 with a gamut correction and a brightness reduction of the incoming signal.

In a preferred embodiment, the brightness reduction is accomplished by multiplying all pixel values in the image with a factor between 0 and 1. After some trial and error a factor of 0.85 appears to provide good results for the images tested (n=10) on a mobile LCD display. As can be seen in FIGS. 10 and 11 the clipping artifacts have disappeared, but the image is a little less bright.

In a preferred embodiment, a solution is based on the perceptual attribute "colorfulness", which is based on the rule-of-thumb that images that are brighter seem to possess more color. In the smart clipping algorithm of a preferred embodiment, a brightness reduction is followed by a gamut (primary) correction but instead of performing a hard clip on the out-of-gamut values (by clipping values smaller than 0 to zero) a smart clip is performed by "adding white" to the out-of-gamut pixels only. This reduces the saturation but at the same time it increases the brightness. In other words, in a preferred embodiment, the saturation is decreased in favor of increased brightness, which gives similar colorfulness on a mobile display as on an EBU display. This smart clipping affects those colors that cannot be represented because one of the RGB values is smaller than zero.

The algorithm of this preferred embodiment is as follows:
correct for the low-saturation gamut.
for pixels with one of R,G,B smaller than 0 the minimum R,G,B value is subtracted from the R,G,B (e.g. (255, 200,−10)—−10=(265,210,0)).
Now, there are no values lower than 0, but still there can be values larger than 255.
a 'clip to black' is performed on the pixels with one R,G,B larger than 255 (e.g. (265,210,0)=>(265,210,0)*255/265=(255,202,0)).

Figure 12:
FIG. 12 illustrates a mobile display optimized for brightness.
Figure 13:
FIG. 13 illustrates the mobile display of FIG. 8 corrected with a smart clipper according to a preferred embodiment of the present invention.

FIG. 13 illustrates the final result of employing a "smart clipper" to the mobile display of FIG. 12, which has only been optimized for brightness.

In an alternative preferred embodiment, in order to prevent a reduction in contrast, the "adding of white" is scaled with the brightness of the pixel such that dark pixels get less white added than bright pixels.

Clipping can be performed by keeping at least one of the color characteristics (luminance, hue, saturation, lightness, colorfulness, etc) constant during the clipping. One way to accomplish this, is to transform the signal to a different space (with some perceptually meaningful coordinates), and perform the clipping in that space. Another method is to use look-up tables. These methods have the disadvantage that they require many operations (e.g. non-linear 'gamma' correction), which is not efficient for mobile applications. Therefore, the preferred 'smart-clipping' method is really an efficient and effective method to render high quality color images on low-quality mobile displays. Especially in the case where the primary colors of the display have roughly the same hue, but lower saturation than the EBU primaries, a simple mapping algorithm of a preferred embodiment the present invention has the advantage that it does not introduce serious color artifacts (color and hue shifts).

Figure 16A:
Figure 16B:
Figure 16C:

FIG. 14 illustrates a matlab script that performs the gamut mapping and 'smart-clipping' color correction. FIGS. 16A-C illustrate the advantage of this embodiment in the appearance of a mobile image. FIG. 16A is a conventional EBU image, FIG. 16B is a mobile display having 85% EBU saturation, FIG. 16C is the mobile display of the image of FIG. 16B modified according to the gamut mapping+smart clipping embodiment of the present invention.

In an alternative preferred embodiment, smart clipping is combined with smart brightness reduction. FIG. 15 illustrates a matlab script that implements this alternative embodiment of gamut mapping, 'smart clipping' and smart brightness reduction.

Figure 16D:

FIGS. 16A-D illustrate the advantage of this alternative embodiment for a mobile display. FIG. 16A is a conventional EBU image, FIG. 16B is a typical mobile display having 85% EBU saturation, FIG. 16C is the mobile display of the image of FIG. 16B modified according to the gamut mapping+smart clipping embodiment of the present invention, and FIG. 16D is the mobile display of image of FIG. 16B modified according to the gamut mapping+smart clipping+smart brightness reduction embodiment of the present invention.

Smart brightness reduction can also be referred to as saturation dependent attenuation. FIG. 17 illustrates the matlab script of gamut mapping, 'smart clipping' and smart brightness reduction further modified for saturation calculation.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt the teaching of the present invention to a particular situation without departing from its central scope. Therefore it is intended that the present invention not be limited to the particular embodiments disclosed as the best mode contemplated for carrying out the present invention, but that the present invention include all embodiments falling within the scope of the appended claims.

The invention claimed is:

1. A method for correcting a color image composed of a plurality of individual colors, the method comprising the steps of:
   correcting the gamut of the color image; and
   smart clipping the corrected image by "adding white" to out-of-gamut digital data of the color image, wherein said smart clipping comprises the steps of:
      adjusting said individual colors by scaling said individual colors based on a smallest value of said individual colors when said smallest value is outside of a color gamut, wherein said individual colors are adjusted by subtracting said smallest value from said individual colors; and
      scaling said adjusted individual colors by multiplying said adjusted individual colors by a ratio of a maximum value of the color gamut to a maximum value of the adjusted individual colors.

2. The method of claim 1, wherein the smart clipping step of "adding white" further comprises the step of scaling with the brightness of digital data having dark digital data getting less white added than bright digital data.

3. The method of claim 1, further comprising the step of reducing overall brightness of the color image.

4. The method of claim 3, wherein said reducing step further comprises the step of multiplying digital data of the color image by a fixed value of 0.85.

5. The method of claim 3, wherein said reducing step further comprises the step of determining the reduction as a function of an input gamut and a display gamut.

6. The method of claim 3, wherein said reducing step further comprises the step of determining the reduction as a function of a saturation of the incoming signal.

7. The method of claim 6, wherein said function is 0 when the saturation is equal to 0, maximal when the saturation greater than 0.75, and equal to a monotonically increasing function as a function of the saturation when the saturation is in the range between 0 and 0.75.

8. The method of claim 1, further comprising the steps of:
   performing a gamma correction on the digital data before the step of correcting the gamut; and
   performing an inverse gamma correction on smart clipped mage.

9. The method of claim 8, further comprising the step of reducing the overall brightness of the color image.

10. The method of claim 9, wherein said reducing step further comprises the step of determining the reduction as a function of a saturation of the incoming signal.

11. The method of claim 10, wherein said function is 0 when the saturation is equal to 0, maximal when the saturation greater than 0.75, and equal to a monotonically increasing function as a function of the saturation when the saturation is in the range between 0 and 0.75.

12. An apparatus for primary color correction and clipping, comprising:
   a means for receiving digital data of a color image having a source gamut;
   a display having a display gamut;
   one of a program memory storing and a calculation logic device providing—
      (i) a plurality of algorithms, that includes smart clipping algorithms, for mapping the source gamut to the display gamut, and
      (ii) a multi-step 'smart' clipper module that executes the plurality of algorithms for mapping the source gamut to the display gamut; and
   a controller/processing unit configured to
      control receipt of the digital data,
      execute the 'smart' clipper module to accomplish mapping the source gamut to the display gamut for the received digital data, wherein said clipping comprises the steps of:

adjusting said individual colors scaling said individual colors based on a smallest value of said digital data individual colors when said smallest value is outside of the display gamut, wherein said individual colors are adjusted by subtracting said smallest value from said individual colors; and scaling said adjusted individual colors by multiplying said individual colors by a ratio of a maximum value of the display gamut of the color image to a maximum value of said adjusted individual colors, and outputting the mapped digital data to the display.

13. The apparatus of claim 12, further comprising a storage device for storing received digital data and output digital data of a color image.

14. The apparatus of claim 13, wherein the plurality of algorithms comprises at least one of:
executable gamma correction algorithms;
gamut mapping algorithms to reduce brightness of digital data of a color image;
smart clipping algorithms to correct digital data of a color image by "adding white" to out-of-gamut digital data of the color image; and
saturation dependent attenuation algorithms.

15. The apparatus of claim 13, wherein the smart clipping algorithms further comprise magnifying the clipping effect based on intensity of digital data of the color image.

16. The apparatus of claim 12, wherein the plurality of algorithms comprises at least one of:
executable gamma correction algorithms;
gamut mapping algorithms to reduce brightness of digital data of a color image;
smart clipping algorithms to correct digital data of a color image by "adding white" to out-of-gamut digital data of the color image; and
saturation dependent attenuation algorithms.

17. The apparatus of claim 16, wherein the smart clipping algorithms further comprise magnifying the clipping effect based on intensity of digital data of the color image.

18. A 'smart' clipper apparatus for primary color correction and clipping, comprising:
a plurality of algorithms, that includes at least a smart clipping algorithm that "adds white" to out-of-gamut digital data of the color image, by adjusting individual colors of said color image by scaling said individual colors based on a smallest value of said individual colors when said smallest value is outside of a color gamut, wherein said individual colors are adjusted by subtracting said smallest value from said individual colors, and scaling said adjusted individual colors by multiplying said individual colors by a ratio of a maximum value of the color gamut to a maximum value of said adjusted individual colors, for mapping a source gamut to a display gamut, and
a multi-step 'smart' clipper module that executes said plurality of algorithms.

19. The 'smart' clipper apparatus of claim 18, wherein the plurality of algorithms comprises at least one of:
executable gamma correction algorithms;
gamut mapping algorithms to reduce brightness of digital data of a color image;
smart dipping algorithms to correct digital data of a color image by "adding white" to out-of-gamut digital data of the color image; and
saturation dependent attenuation algorithms.

20. The 'smart' dipper apparatus of claim 19, wherein the smart dipping algorithms further comprise magnifying the clipping effect based on intensity of digital data of the color image.

21. A non-transitory computer readable medium, comprising instructions accessed by a processor for causing said processor to execute:
a plurality of algorithms, that includes smart clipping algorithms, for mapping a source gamut to a display comprising:
executable gamma correction algorithms;
gamut mapping algorithms to reduce brightness of digital data of a color image;
smart clipping algorithms to correct digital data of a color image by "adding white" to out-of-gamut digital data of the color image, wherein said clipping comprises the steps of:
adjusting said individual colors by scaling said individual colors based on a smallest value of said digital data individual colors, when said smallest value is outside of a color gamut by subtracting said smallest value from said individual colors; and
scaling said adjusted individual color by multiplying said individual colors by a ratio of a maximum value of the color gamut to a maximum value of the adjusted individual colors, and
a multi-step 'smart' dipper module that executes said plurality of algorithms.

22. The non-transitory computer readable medium of claim 21, wherein the smart dipping algorithms further comprise magnifying the clipping effect based on intensity of digital data of the color image.

* * * * *